United States Patent [19]
Yamaguchi

[11] Patent Number: 5,598,217
[45] Date of Patent: Jan. 28, 1997

[54] CIRCUIT FOR EXECUTING AN INTERPOLATION PROCESSING ON A SUB-SAMPLED IMAGE SIGNAL

[75] Inventor: Ryuichi Yamaguchi, Osaka, Japan

[73] Assignee: Matsushita Electric Industrial Co., Ltd., Osaka, Japan

[21] Appl. No.: 347,115

[22] Filed: Nov. 23, 1994

[30] Foreign Application Priority Data

Dec. 7, 1993 [JP] Japan .................................. 5-306199

[51] Int. Cl.$^6$ ..................................................... H04N 7/24
[52] U.S. Cl. ............................................ 348/424; 348/392
[58] Field of Search .................................... 348/392, 398, 348/424, 425, 384, 390, 399; H04N 7/130

[56] References Cited

U.S. PATENT DOCUMENTS

| | | | |
|---|---|---|---|
| 4,692,801 | 9/1987 | Ninomiya et al. | 348/425 |
| 4,879,599 | 11/1989 | Honda . | |
| 4,979,037 | 12/1990 | Mizutani et al. | 348/424 |
| 4,979,040 | 12/1990 | Masumoto | 348/424 |
| 4,984,077 | 1/1991 | Uchida | 348/424 |
| 5,018,010 | 5/1991 | Masumoto | 348/424 |
| 5,047,838 | 9/1991 | Murakami et al. | 348/392 |
| 5,067,016 | 11/1991 | Wang | 348/424 |
| 5,128,759 | 7/1992 | Matsunaga | 348/424 |
| 5,130,796 | 7/1992 | Isobe et al. | 348/424 |
| 5,450,214 | 9/1995 | Nobuoka | 348/392 |
| 5,459,514 | 10/1995 | Sakamoto et al. | 348/398 |

Primary Examiner—Thai Q. Tran
Assistant Examiner—Richard Lee
Attorney, Agent, or Firm—McDermott, Will & Emery

[57] ABSTRACT

After limited in band area with a vertical or horizontal low-pass filter in a sub-sampling circuit at the image-signal transmitting side, an image signal is sub-sampled as interframe offset in the form of a quincunx, and then transmitted to an image-signal receiving side through a transmission system. The sampling rate of the image signal thus received is converted by a sampling rate conversion portion. According to the operation of a changeover switch by the operator who watches a Braun tube for image reproduction, a selector selects the image signal interpolated with a vertical filter of a low-pass portion when the sub-sampling circuit uses a vertical filter, or the image signal interpolated with both vertical and horizontal low-pass filters when the sub-sampling circuit uses a two dimensional filter. Thus, there is supplied an image signal which has been interpolated with a low-pass filter of which transmissible band area is identical with or approximate to that of the low-pass filter in the sub-sampling circuit at the signal transmitting side, such that the image signal contains no aliasing interference of a spatial frequency band area. Thus, there can be reproduced a good picture in which a horizontal straight line is not displayed as a broken line.

10 Claims, 14 Drawing Sheets

EVEN-NUMBERED FRAME

ODD-NUMBERED FRAME

CIRCUIT FOR EXECUTING AN INTERPOLATION PROCESSING ON A SUB-SAMPLED IMAGE SIGNAL

[BACKGROUND OF THE INVENTION]

The present invention relates to a circuit for executing an interpolation processing on a sub-sampled image signal, and more particularly to improvements in a circuit in which, after a first image signal primitively sampled in the form of a square lattice has been limited in band area by a prefilter and then sub-sampled as inter-frame offset in the form of a quincunx to generate a second image signal, an interpolation processing is executed on the second image signal in moving areas.

As a conventional technique of compressing the band area of an image signal, there is known the sub-sampling technique. According to this sub-sampling technique, a primitively sampled digital image signal is further repeatedly subjected to a sampling processing to reduce the image signal in the amount of information, thereby to compress the band area thereof. The image signal thus compressed in band area by this sub-sampling technique is to be transmitted in a narrow transmission band area from the transmitting side such as a TV station or the like to a TV receiving side through a transmission system.

FIG. 13 shows the arrangement of the transmitting side such as a TV station.

Shown in FIG. 13 are an A/D converting circuit 70 for converting an image signal from a television camera or the like from an analog signal to a digital signal, a stationary area prefilter 71 and a moving area prefilter 72 for executing a prefilter processing on the digital image signal from the A/D converting circuit 70, and an inter-field offset sampling circuit 73 for subjecting the image signal from the stationary area prefilter 71 to an inter-field offset sampling.

A moving area detector circuit 74 is disposed for detecting, based on the image signal from the moving area prefilter 72, whether or not the picture area formed by the image signal is a moving area. A mixing device 75 is arranged such that, based on the result of detection by the moving area detector circuit 74, the mixing device 75 either selects an output of the moving area prefilter 72 or an output of the inter-field offset sub-sampling circuit 73, or mixes the both outputs of the circuits 72, 73 at a predetermined mixing ratio. An inter-frame offset sub-sampling circuit 76 is disposed for subjecting an image signal supplied form the mixing device 75 to inter-frame offset sub-sampling, thereby to compress the band area of the image signal.

In a stationary area, the image signal is subjected to a prefilter processing using the stationary area prefilter 71 and then subjected to inter-field offset sub-sampling and inter-frame offset sub-sampling such that the information of the image signal is compressed. In a moving area, the image signal is subjected to a prefilter processing using the moving area prefilter 72 and then subjected to inter-frame offset sub-sampling such that the information of the image signal is compressed.

Further, a D/A converting circuit 77 is disposed for converting the image signal from the inter-frame offset sub-sampling circuit 76 from a digital signal to an analog signal. An output circuit 78 is disposed for externally supplying an image signal from the D/A converting circuit 77.

When the image signal thus sub-sampled at the transmitting side is to be received by a television receiver or the like, the television receiver or the like has, as a circuit for reproducing a picture from the received signal, a circuit for executing an interpolation processing on the image signal.

As shown in "MUSE-High Vision Transmission System" (Yuichi NINOMIYA, Institute of Electronics, Information and Communication Engineers, 1990), such an image signal interpolation processing circuit has two different picture reproducing methods for the case where the original picture is stationary and the case where the original picture is moving. In the stationary areas, the original picture is reproduced by executing an inter-frame interpolation using a plurality of frames. In the moving areas, a 1-frame signal is subjected to a processing of sampling rate conversion, and then subjected to an interpolation processing using a low-pass filter, thereby to reproduce a picture from the only 1-frame image signal.

FIG. 14 shows the arrangement above-mentioned of a television receiver or the like.

Shown in FIG. 14 are an A/D converting circuit 80 for converting a received image signal from an analog signal to a digital signal, a frame interpolation circuit 81 for subjecting a digital image signal from the A/D converting circuit 80 to a frame interpolation, a field interpolation circuit 82 for subjecting an image signal interpolated by the frame interpolation circuit 81 to a field interpolation, and an intra-field interpolation circuit 83 for subjecting a digital image signal from the A/D converting circuit 80 to intra-field interpolation.

A moving area detector circuit 84 is disposed for detecting, based on the image signal form the A/D converting circuit 80, whether or not the picture area formed by the image signal is a moving area. A mixing device 85 is arranged such that, based on the result of detection by the moving area detector circuit 84, the mixing device 85 either selects an image signal from the field interpolation circuit 82 or an image signal from the intra-field interpolation circuit 83, or mixes the both image signals of the circuits 82, 83 at a predetermined mixing ratio. An output circuit 86 is disposed for externally supplying an image signal supplied from the mixing device 85 to a TV receiver or the like.

In the moving area, there is used, in the sub-sampling circuit, a prefilter through which the image signal passes only at the transmissible area of the picture, thereby to limit the image signal in band area, thus preventing aliasing interference of the signal. Accordingly, a stationary area is transmitted without the amount of information reduced, but a moving area is reduced in the amount of information due to limitation of band area. However, a man's visual sensation is lower to a moving area than to a stationary area. Therefore, a reduction in resolution of a motion picture is hardly sensed and presents no trouble.

With reference to attached drawings, the following description will discuss an example of a conventional circuit for executing an interpolation processing on all image signal when processing such a motion picture as above-mentioned.

First, there is discussed how to generate and transmit an image signal to be received by the interpolation processing circuit. At the image-signal transmitting side such as a TV station or the like, a primitive sampling signal is entered at a signal input portion and then limited in band area by a prefilter comprising a low-pass filter portion to eliminate the high frequency component contained in the primitive sampling signal. Thereafter, the signal is subjected to a sampling processing at a sub-sampling portion.

The primitive sampling signal is an image signal sub-sampled in the form of a square lattice in which the horizontal direction is expressed in terms of h(Hz) and the vertical direction is expressed in terms of v(TV piece). As shown in FIG. 6 according to the sampling theorem, the band area of transmissible frequency of the primitive sampling signal is defined by the horizontal spatial frequency of h/2(Hz) and the vertical spatial frequency of v/2 (TV piece).

The following description will discuss a case where the primitive sampling signal is compressed in band area to ½ by sub-sampling. At a sub-sampling portion, out of sampling points 51 of the primitive sampling signal in FIG. 5, sampling points 52 are selected in the form of a quincunx for the even-numbered frames and sampling points 53 are selected, as shown in FIGS. 7(a) and (b), respectively. Thus, the primitive sampling signal is transmitted as compressed in band area to ½.

FIG. 15 shows a block diagram of a conventional interpolation processing circuit.

Shown in FIG. 15 are a transmission system 90 to which an image signal compressed in band area is to be transmitted from a TV station or the like. A sampling rate conversion portion 91 is disposed for inserting a zero value to each of the interpolation points of an image signal received from the transmission system 90. A low-pass filter portion 92 is disposed for executing an interpolation processing on an image signal from the sampling rate conversion portion 91. A signal output portion 93 is disposed for supplying an image signal from the low-pass filter portion 92. A Braun tube 94 is disposed for displaying a picture upon reception of an image signal from the signal output portion 93.

In the interpolation processing circuit having the arrangement above-mentioned, after an image signal compressed in band area has been received from the transmission system 90, the sampling rate conversion portion 91 is operated to put, (i) in the even-numbered frames of the image signal, zero into each of other sampling points than the sampling points 52 in the even-numbered frames in the form of a quincunx shown in FIG. 7(a), i.e., the points corresponding to the sampling points 53 in the odd-numbered frames in FIG. 7(b), and (ii) in the odd-numbered frames of the image signal, zero into each of other sampling points than the sampling points 53 in the odd-numbered frames in FIG. 7(b), i.e., the points corresponding to the sampling points 52 in the even-numbered frames in FIG. 7(a). Thus, the sampling frequency of the image signal is returned to the original one. Thereafter, the signal thus subjected to sampling rate conversion is subjected to a low-pass filter using the low-pass filter portion 92 such that an interpolation processing is executed. The image signal thus interpolation-processed is then supplied from the signal output portion 93 and reproduced on the externally disposed Braun tube 94.

As shown in "Consideration about a Chrominance Signal Processing for MUSE System" (the Transactions of the Institute of Electronics, Information and Communication Engineers B-1, vol. j76-B-1, No. 3, pp. 290–298, March, 1993), a prefilter used in sub-sampling is changed in filter configuration to improve a reproduced image in quality. The low-pass filter used in interpolation is also changed in filter configuration according to the change in filter configuration of the prefilter used in sub-sampling.

The transmissible signal band area in the transmission system depends on the sub-sampling circuit at the TV station side and on the low-pass filter in the interpolation processing circuit at the image-signal receiving side. For example, when a vertical filter is used in the sub-sampling circuit 76 in FIG. 13, the vertical spatial frequency is limited to v/4 (TV piece) or a half as compared with that of the primitive sampling signal. When a two dimensional low-pass filter is used, the transmissible signal band area is triangular as shown in FIG. 9. It is desired that the spatial frequency characteristics of the low-pass filter portion 92 in the interpolation processing circuit are identical with or approximate to, with high precision, the spatial frequency characteristics of a low-pass filter portion 2 in the sub-sampling circuit at the TV station side.

However, there are instances where, due to improvements and advances in the technique of a TV receiver or the like, the transmissible band area at the TV receiver side is not identical with or approximate to, with high precision, the transmissible band area at the TV station side. As a result, there may be a case for example where there is used, as the low-pass filter portion 92 in the interpolation processing circuit at the image-signal receiving side, a vertical low-pass filter presenting a rectangular transmissible band area shown in FIG. 8 although there is used, as the sub-sampling circuit 76 at the image-signal transmitting side, a two dimensional low-pass filter presenting a triangular transmissible band area shown in FIG. 9. In such a case, a band area A1 shown in FIG. 10 is folded down to a band area A2 at the image-signal receiving side. This disadvantageously produces, for example, interference that a horizontal straight line of a reproduced picture is converted into a broken line.

[APPLICATION OF THE DISCLOSURE]

It is an object of the present invention to provide an interpolation processing circuit capable of restraining the occurrence of interference in image reproduction due to aliasing interference of a band area at an image-signal receiving side no matter what may be the image-signal transmissible band area in the sub-sampling circuit at the image-signal transmitting side.

To achieve the object above-mentioned, the present invention is arranged such that a circuit for executing an interpolation processing on a sub-sampled image signal, previously incorporates a plurality of low-pass filters of which image signal transmissible band areas are different from one another, and that there is selected, out of the plurality of low-pass filters, the filter of which transmissible band area is fit to the transmissible band area of the low-pass filter in the sub-sampling circuit at the image-signal transmitting side.

To achieve the object above-mentioned, the present invention is also arranged such that a circuit for executing an interpolation processing on a sub-sampled image signal, incorporates a low-pass portion of which transmissible band area previously corresponds to the overlapping portion of the respective image signal transmissible band areas of a plurality of types of low-pass filters used in the sub-sampling circuit at the image-signal transmitting side.

According to the present invention, a circuit for executing an interpolation processing on a sub-sampled image signal, is so arranged as to receive, from a transmitting side comprising (i) a transmitting-side low-pass filter portion which uses, as a prefilter for eliminating the high frequency component of a first image signal primitively sampled in the form of a square lattice, one of a first low-pass filter and a second low-pass filter of which transmissible band area is different from that of the first low-pass filter, and (ii) a sub-sampling portion for sub-sampling the first image signal after limited in band area by the transmitting-side low-pass filter portion, the first image signal being sub-sampled as inter-frame offset in the form of a quincunx, a second image signal obtained by sub-sampling the first image signal by the sub-sampling portion, the second image signal being to be subjected to interpolation processing, the circuit for executing an interpolation processing on a sub-sampled image signal, comprising:

a sampling rate conversion portion for generating a third image signal by interpolating zero into the second image signal;

a low-pass portion for generating (i) a fourth image signal by interpolating the third image signal generated by the sampling rate conversion portion, with a low-pass filter of which transmissible band area previously corresponds to the transmissible band area of the first low-pass filter, and (ii) a fifth image signal by interpolating the third image signal generated by the sampling rate conversion portion, with a low-pass filter of which transmissible band area previously corresponds to the transmissible band area of the second low-pass filter;

selection control means for supplying an instruction signal which instructs to select the fourth or fifth image signal generated by the low-pass portion; and a signal selecting portion for selecting, based on the contents of the instruction signal from the selection control means, the fourth or fifth image signal generated by the low-pass portion, the fourth or fifth image signal thus selected being then supplied.

According to the present invention, there is also disposed a Braun tube for displaying, on the screen thereof, the fourth or fifth image signal supplied from the signal selecting portion, and the selection control means is a changeover switch to be manually operated by the operator who watches the screen of the Braun tube, the manual operation being made based on the quality of a picture on the screen.

According to the present invention, the selection control means is arranged to generate an instruction signal based on (i) the second image signal obtained by sub-sampling the first image signal by the sub-sampling portion, and (ii) the fourth and fifth image signals generated by the low-pass portion.

In the arrangement above-mentioned according to the present invention, the first low-pass filter of the transmitting-side low-pass filter portion is a vertical low-pass filter, the second low-pass filter of the transmitting-side low-pass filter portion is a two dimensional low-pass filter, and the low-pass portion comprises: a vertical low-pass portion for generating the fourth image signal by interpolating, with a vertical low-pass filter, the third image signal from the sampling rate conversion portion; and a horizontal low-pass portion for generating the fifth image signal by interpolating, with a horizontal low-pass filter, the fourth image signal from the vertical low-pass portion.

In the arrangement above-mentioned according to the present invention, the first low-pass filter is a vertical low-pass filter and the second low-pass filter is a two dimensional low-pass filter, and the selection control means comprises:

a vertical interpolating portion for interpolating, with the vertical low-pass filter, the Nth frame of the third image signal at the sampling rate conversion portion, thereby to generate first interpolation points;

a two dimensional interpolating portion for interpolating, with the two dimensional low-pass filter, the Nth frame of the third image signal at the sampling rate conversion portion, thereby to generate second interpolation points;

a first difference operating portion for generating differences between the sampling points of the (N+1)th frame of the third image signal and the first interpolation points;

a second difference operating portion for generating differences between the sampling points of the (N+1)th frame of the third image signal and the second interpolation points; and a comparator for comparing the differences generated by the first difference operating portion with the differences generated by the second difference operating portion and for supplying an instruction signal such that the fourth image signal is selected when the differences generated by the first difference operating portion are smaller than the differences generated by the second difference operating portion, or the fifth image signal is selected when the differences generated by the first difference operating portion are not less than the differences generated by the second difference operating portion.

The present invention also provides a circuit for executing an interpolation processing on a sub-sampled image signal, so arranged as to receive, from a transmitting side comprising (i) a transmitting-side low-pass filter portion which uses, as a prefilter for eliminating the high frequency component of a first image signal primitively sampled in the form of a square lattice, one of a first low-pass filter and a second low-pass filter of which transmissible band area is different from that of the first low-pass filter, and (ii) a sub-sampling portion for sub-sampling the first image signal after limited in band area by the transmitting-side low-pass filter portion, the first image signal being sub-sampled as inter-frame offset in the form of a quincunx, a second image signal obtained by sub-sampling the first image signal by the sub-sampling portion, the second image signal being subjected to interpolation processing, the circuit for executing an interpolation processing on a sub-sampled image signal comprising:

a sampling rate conversion portion for generating a third image signal by interpolating zero into the second image signal; and a low-pass portion for generating a fourth image signal by interpolating the third image signal generated by the sampling rate conversion portion, with a low-pass filter of which transmissible band area previously corresponds to the overlapping portion of the respective transmissible band areas of the first low-pass filter and the second low-pass filter.

According to the image signal interpolation processing circuit of the present invention having the arrangement above-mentioned, when the first low-pass filter is employed at the transmitting-side low-pass filter portion, the low-pass portion generates the fourth image signal interpolated with the low-pass filter of which transmissible band area previously corresponds to the transmissible band area of the first low-pass filter, and this fourth image signal contains no aliasing interference. On the other hand, when the second low-pass filter is employed at the transmitting-side low-pass filter portion, the low-pass portion generates the fifth image signal interpolated with the low-pass filter of which transmissible band area previously corresponds to the transmissible band area of the second low-pass filter, and this fifth image signal contains no aliasing interference. Accordingly, when an image signal to be supplied from the signal selecting portion is selectively switched by the selection control means, the signal selecting portion can supply an image signal interpolated in a band area identical with or approximate to the transmissible band area of the sub-sampling circuit at the image-signal transmitting side, thus preventing the occurrence of aliasing interference.

In particular, the present invention is arranged such that, while watching the picture display on the Braun tube, the operator operates the changeover switch such that there can be selected the fourth or fifth image signal (containing no aliasing interference) to be reproduced in a good picture in which a horizontal straight line is not displayed as a broken line.

According to the present invention, the selection control means generates, based on the fourth and fifth image signals generated by the low-pass portion, i.e., based on a signal containing aliasing interference and a signal containing no aliasing interference, an instruction signal representing which image signal is to be selected. Thus, the image signal containing no aliasing interference is accurately automatically selected.

According to the present invention, when the transmitting-side low-pass filter portion employs the two dimensional low-pass filter, there is selected, as an output of the signal selecting portion, the fifth image signal obtained by further interpolating, with the horizontal low-pass portion, the fourth image signal interpolated with the vertical low-pass portion. The signal transmissible band area of the two dimensional low-pass filter of the transmitting-side low-pass filter portion is a predetermined triangular area, while the overlapping portion of the signal transmissible band areas of the vertical and horizontal low-pass portions, is a rectangular area contained in the triangular area above-mentioned, thus lowering the signal in the amount of information. However, a man's visual sensation is lower to a moving area than to a stationary area. Therefore, a reduction in resolution of a moving area is hardly sensed and presents no trouble. Further, the horizontal low-pass portion is simpler in arrangement than the two dimensional low-pass filter. Thus, the entire circuit can be reduced in size and made in a compact design.

According to the present invention, in the automatic selection of an image signal by the selection control means, when the differences at the first difference operating portion are smaller than the differences at the second difference operating portion, i.e., when the transmitting-side low-pass filter portion has a vertical low-pass filter, the comparator supplies an instruction signal such that there is selected the fourth image signal interpolated with the vertical low-pass filter of which transmissible band area is identical with that of the first-mentioned vertical low-pass filter. On the other hand, when the differences at the second difference operating portion are smaller than the differences at the first difference operating portion, i.e., when the transmitting-side low-pass filter portion has a two dimensional low-pass filter, the comparator supplies an instruction signal such that there is selected the fifth image signal interpolated with the two dimensional low-pass filter of which transmissible band area is identical with that of the first-mentioned two dimensional low-pass filter.

According to the present invention, the transmissible band area of the low-pass filter disposed at the low-pass portion previously corresponds to the overlapping portion of the respective transmissible band areas of a plurality of types of low-pass filters which can be employed at the transmitting-side low-pass filter portion. Accordingly, no matter which low-pass filter may be employed at the transmitting-side low-pass filter portion, the image signal supplied from the low-pass portion always contains no interference due to aliasing interference. Thus, a good picture can be reproduced.

These and other features, objects and advantages of the present invention will be more fully apparent from the following detailed description set forth below when taken in conjunction with the accompanying drawings.

[DESCRIPTION OF THE INVENTION]

The following description will discuss preferred embodiments of the present invention with reference to attached drawings.

(FIRST EMBODIMENT)

Figure 1:
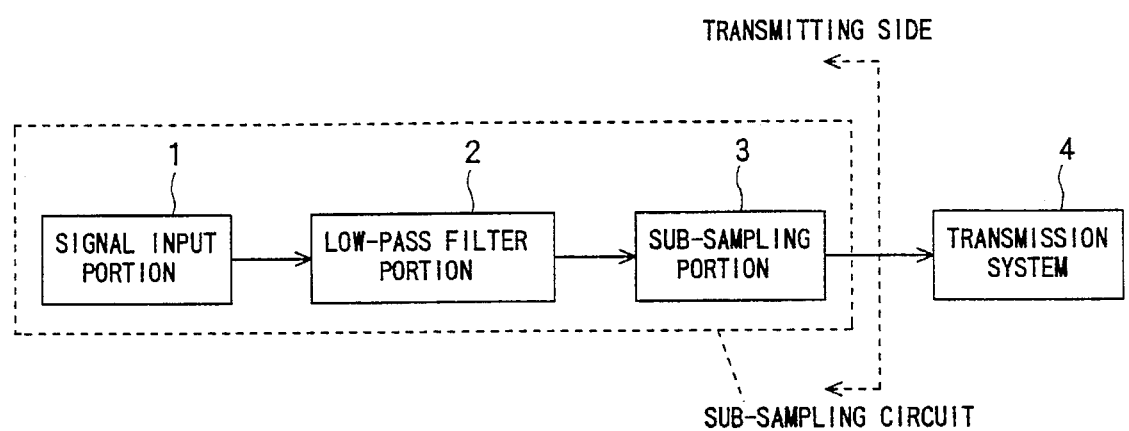
FIG. 1 is a block diagram of a sub-sampling circuit.
Figure 5:
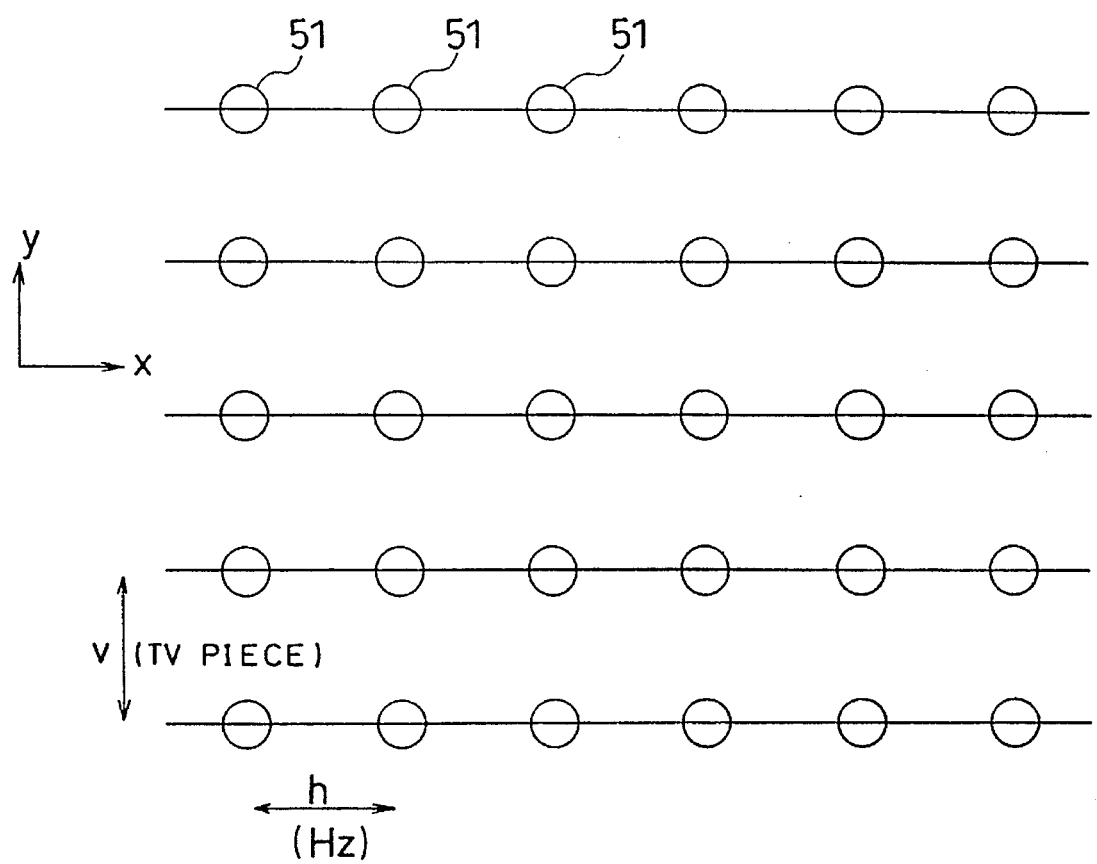
FIG. 5 is a view of a primitive sampling signal.
Figure 6:
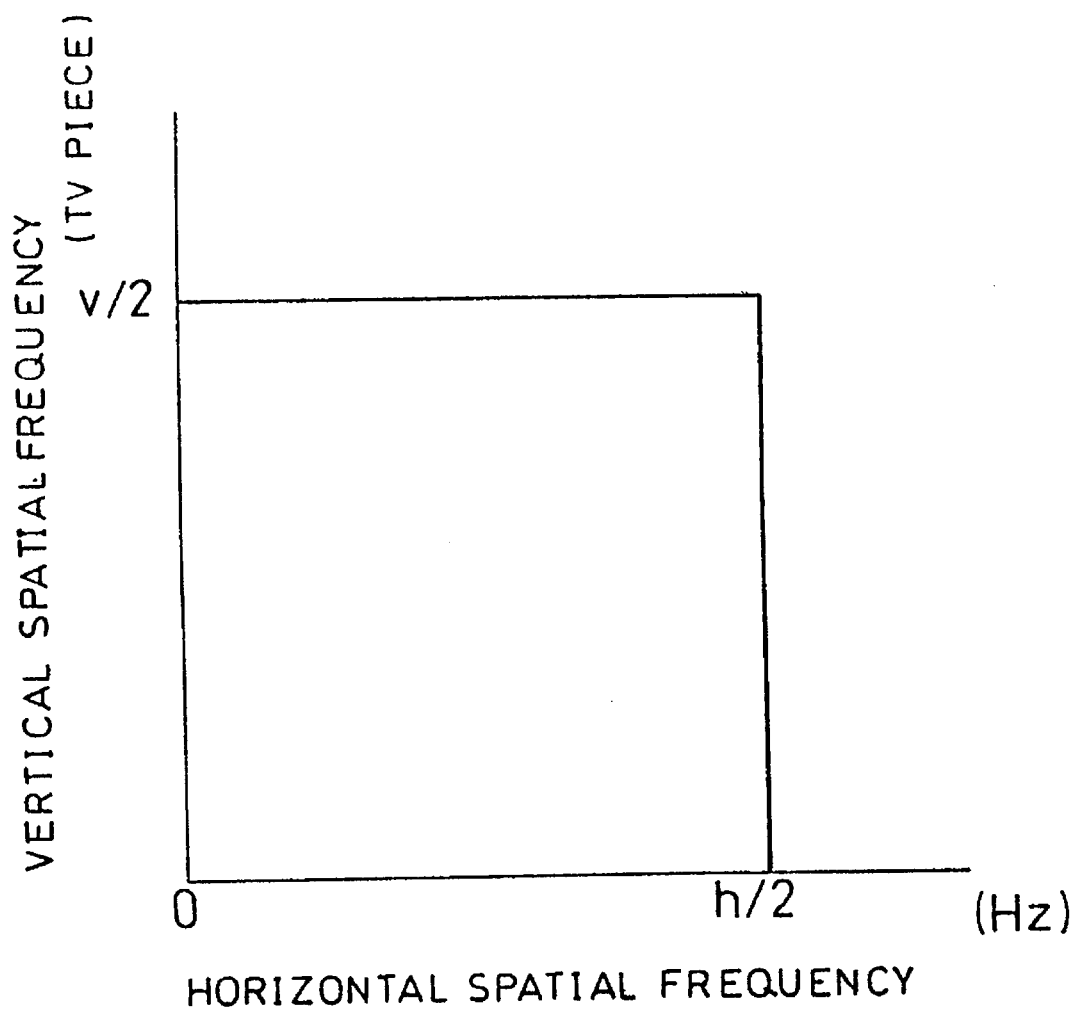
FIG. 6 is a view of the transmissible band area of the primitive sampling signal.

FIG. 1 is a block diagram of a sub-sampling circuit disposed at the transmitting side of an image signal. In FIG. 1, a signal input portion 1 is disposed for receiving a primitive sampling signal serving as a first image signal as shown in FIG. 5. A low-pass filter portion (transmitting-side low-pass filter portion) 2 serves as a prefilter for limiting the transmissible band area of a primitive sampling signal from the signal input portion 1. A sub-sampling portion 3 is disposed for further sub-sampling a primitive sampling signal which has passed through the low-pass filter portion 2.

A transmission system 4 is disposed for transmitting, to a receiving side, a sub-sampling image signal sub-sampled by the sub-sampling portion 3.

Figure 8:
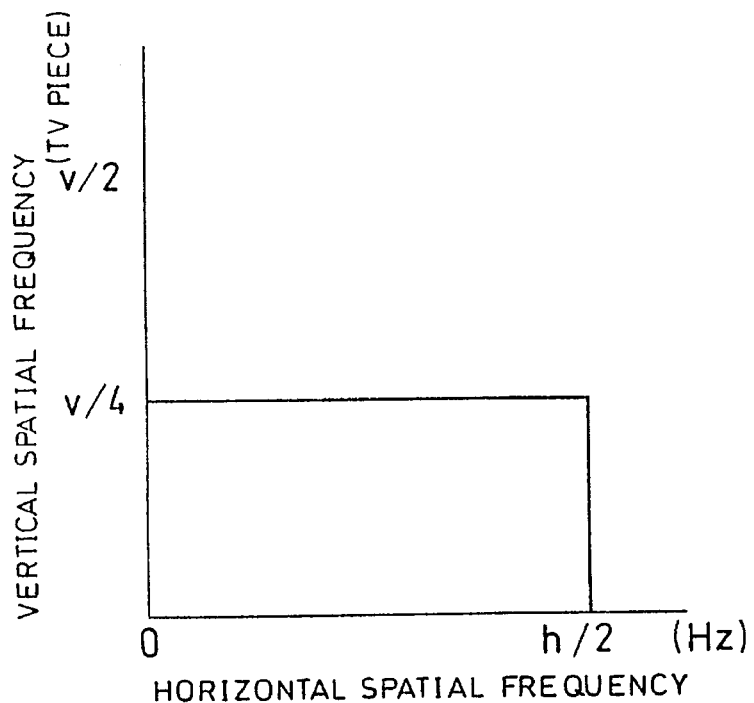
FIG. 8 is a view of the sub-sampling signal transmissible band area of a vertical low-pass filter.

In the low-pass filter portion 2, there is used, as a prefilter, one of a vertical low-pass filter (first low-pass filter) and a two dimensional low-pass filter (second low-pass filter). As shown in FIG. 8, the transmissible band area of a sub-sampling signal when the vertical low-pass filter is used, is a rectangular area of which vertical spatial frequency is v/4

Figure 9:
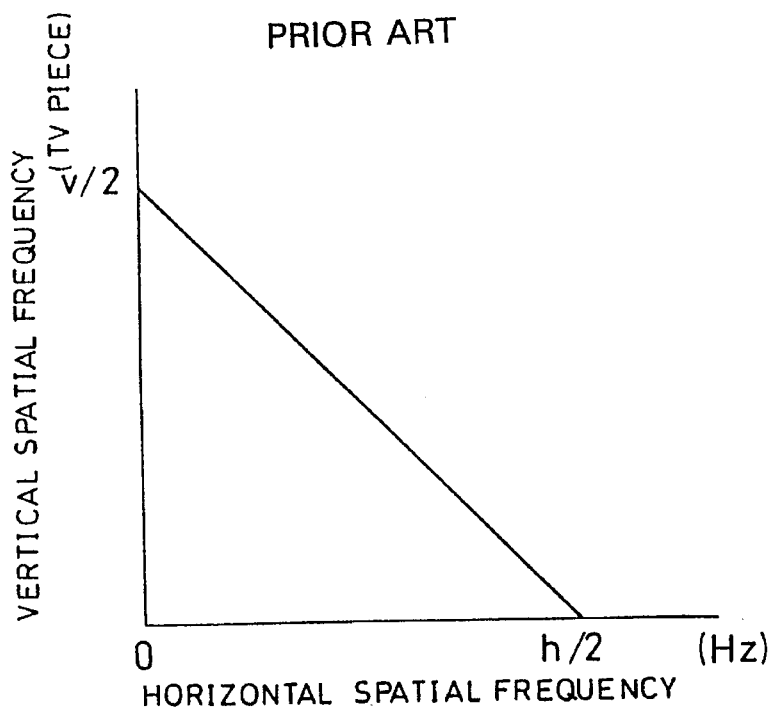
FIG. 9 is a view of the sub-sampling signal transmissible band area of a two dimensional low-pass filter.

(TV piece) and of which horizontal spatial frequency is h/2(Hz). As shown in FIG. 9, the transmissible band area of a sub-sampling signal when the two dimensional low-pass filter 14 is used, is a triangular area of which vertical spatial frequency is max. v/2 (TV piece) and of which horizontal spatial frequency is max h/2(Hz).

Figure 7A:
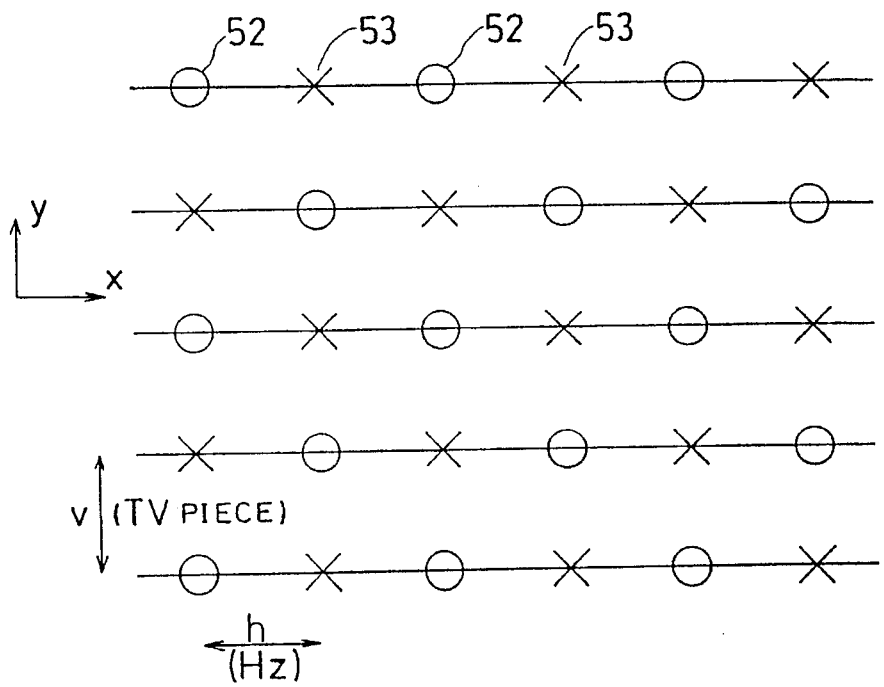
FIG. 7(a) is a view of a sub-sampling signal in an even-numbered frame.

A sub-sampling signal serving as a second image signal to be supplied from the sub-sampling portion 3 to the transmission system 4, is a signal (second image signal) obtained by sub-sampling a primitive sampling signal (See FIG. 5) as inter-frame offset in the form of a quincunx as shown in FIGS. 7(a) and (b). FIG. 7 shows sampling points 52 in the even-numbered frames and sampling points 53 in the odd-numbered frames.

Figure 2:
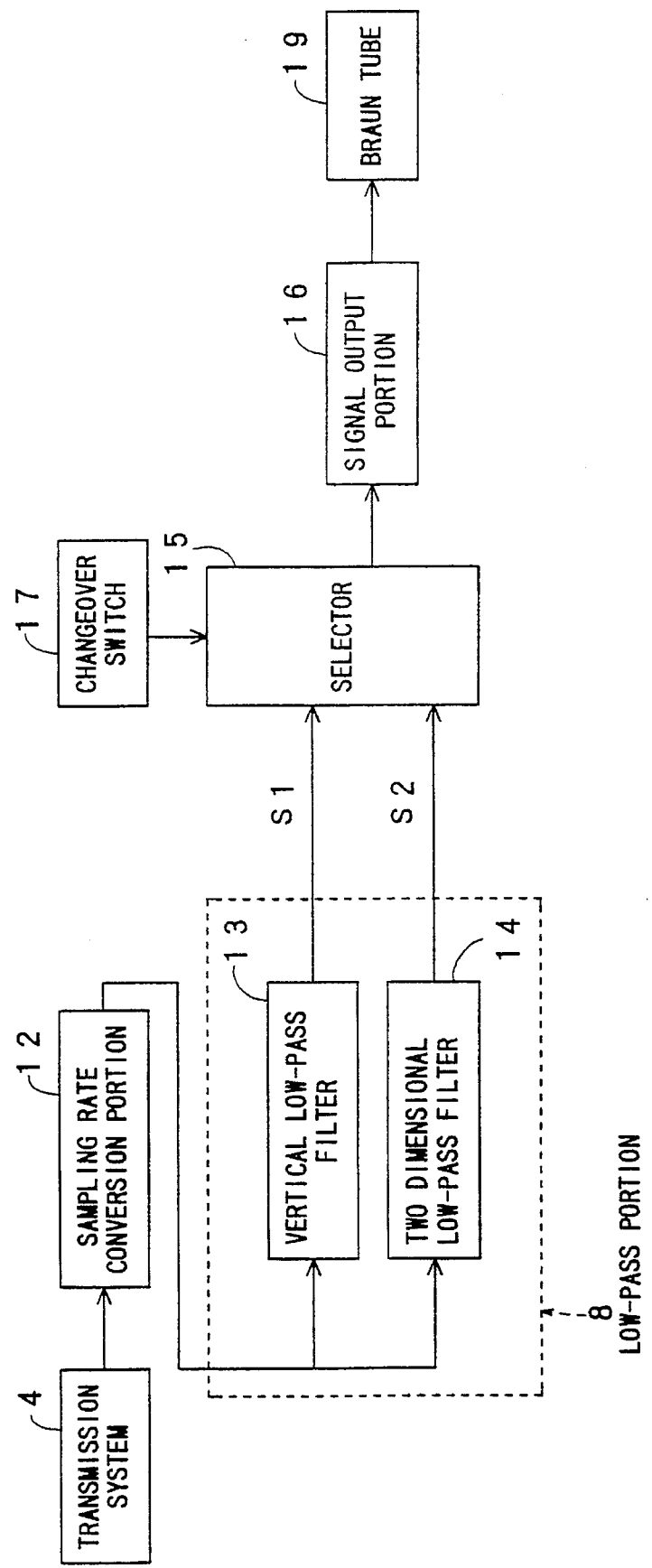
FIG. 2 is a block diagram of an interpolation processing circuit according to a first embodiment of the present invention.

FIG. 2 shows a sub-sampled image signal interpolation processing circuit to which the present invention is directed, and which is a circuit for executing an interpolation processing on an image signal received from the transmission system 4 in FIG. 1.

Shown in FIG. 2 is the transmission system 4 to which an image signal is to be transmitted from the sub-sampling circuit in FIG. 1.

A sampling rate conversion portion 12 is disposed for generating a third image signal by inserting zero into each of interpolation points of an image signal received from the transmission system 4.

In FIG. 2, a low-pass portion 8 incorporates a vertical low-pass filter (vertical low-pass portion) 13 and a two dimensional low-pass filter (two dimensional low-pass portion) 14. In the vertical low-pass filter 13, the cutoff frequency is equal to v/4 (TV piece). In that transmissible band area of the vertical low-pass filter 13 which previously corresponds to the image-signal transmissible band area provided at the time when the low-pass filter portion 2 in the sub-sampling circuit in FIG. 1 is a vertical low-pass filter, the third image signal from the sampling rate conversion portion 12 is interpolated to generate an image signal S1 serving as a fourth signal. The two dimensional low-pass filter 14 has a transmissible band area which previously corresponds to the image-signal transmissible band area provided at the time when the low-pass filter portion 2 in the sub-sampling circuit in FIG. 1 is a two dimensional low-pass filter. More specifically, the transmissible band area of the two dimensional low-pass filter 14 is a triangular area defined by the maximum vertical spatial frequency of v/2 (TV piece) and the maximum horizontal spatial frequency of h/2(Hz). In this transmissible band area, the third image signal from the sampling rate conversion portion 12 is interpolated to generate an image signal S2 serving as a fifth image signal.

Further, a selector (signal selecting portion) 15 serves as a signal selecting portion for selecting the image signal S1 of the vertical low-pass filter 13 or the image signal S2 of the two dimensional low-pass filter 14. A signal output portion 16 is disposed for externally supplying the image signal selected by the selector 15. A changeover switch (selection control means) 17 is to be manually operated by the operator who watches a Braun tube 19 having a picture display screen. Its changeover signal is to be supplied to the selector 15. Upon reception of the changeover signal, the selector 15 is arranged to select, based on the contents of the changeover signal, the image signal S1 from the vertical low-pass filter 13 or the image signal S2 from the two dimensional low-pass filter 14.

The Braun tube 19 is disposed for displaying a motion picture upon reception of an image signal from the signal output portion 16.

The following description will discuss the operation of the interpolation processing circuit according to the first embodiment of the present invention having the arrangement above-mentioned.

Figure 7B:
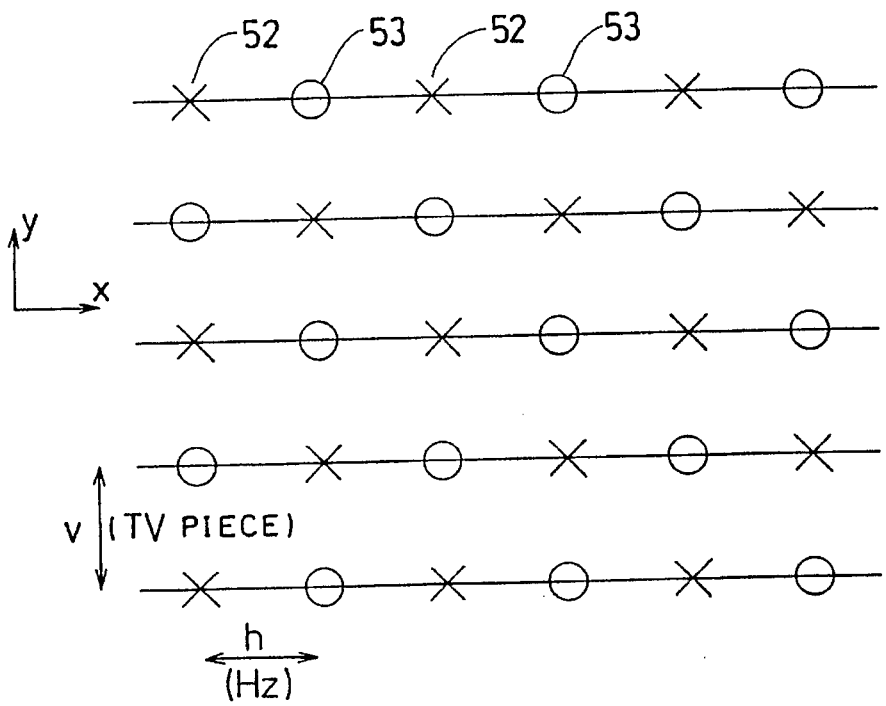
FIG. 7(b) is a view of a sub-sampling signal in an odd-numbered frame.

In the interpolation processing circuit in FIG. 2, after an image signal compressed in band area by the sub-sampling circuit in FIG. 1 has been received through the transmission system 4, the sampling rate conversion portion 12 is operated to put, (i) in the even-numbered frames of the image signal, zero into each of other sampling points than the sampling points 52 in the even-numbered frames in the form of a quincunx shown in FIG. 7(a), i.e., the points corresponding to the sampling points 53 in the odd-numbered frames, and (ii) in the odd-numbered frames of the image signal, zero into each of other sampling points than the sampling points 53 in the odd-numbered frames in FIG. 7(b). Thus, the sampling frequency of the image signal is returned to the original one.

In the vertical low-pass filter 13 of the low-pass portion 8, an image signal S1 is generated by executing, in a vertical direction, an interpolation processing on a signal which has been subjected to sampling rate conversion. Accordingly, the image signal S1 thus generated is limited in band area to v/4 (TV piece) in a vertical direction, and the transmissible band area is identical with the transmissible band area provided at the time when a vertical low-pass filter is used as the low-pass filter portion 2 in the sub-sampling circuit shown in FIG. 1.

The two dimensional low-pass filter 14 of the low-pass portion 8 generates an image signal S2 by executing an interpolation processing, in the two dimensional directions, i.e., vertical and horizontal directions, on the signal which has been subjected to sampling rate conversion. Accordingly, the transmissible band area of the image signal S2 thus generated is a triangular band area defined by the maximum vertical spatial frequency of v/2 (TV piece) and the maximum horizontal spatial frequency h/2(Hz). This triangular band area is corresponding to and identical with the transmissible band area of the image signal at the time when the low-pass filter portion 2 of the sub-sampling circuit shown in FIG. 1 is a two dimensional low-pass filter.

The selector 15 selects, based on the contents of a selection instructing signal from the changeover switch 17, the image signal S1 or the image signal S2, and the signal output portion 16 externally supplies the image signal S1 or S2 thus selected to reproduce the image signal S1 or S2.

More specifically, the operator alternately switches the changeover switch 17 such that the image signal S1 from the vertical low-pass filter 13 and the image signal S2 from the two dimensional low-pass filter 14 are alternately selected, and the image signal S1 or S2 thus selected is reproduced on the picture display screen of the Braun tube.

When a vertical low-pass filter is used as the low-pass filter portion 2 in the sub-sampling circuit, the transmissible band area of an image signal transmitted through the transmission system 4, is a rectangular area defined by a vertical spatial frequency of v/4 (TV piece) and a horizontal spatial frequency of h/2(Hz) shown in FIG. 8. This rectangular area is identical with the transmissible band area of the image signal S1 from the vertical low-pass filter 13. Accordingly, the image signal from the sub-sampling circuit at the image-signal transmitting side, is transmitted as the image signal S1 without any loss. When the image signal S1 is reproduced on the Braun tube, the screen displays a good image in which a horizontal straight line is not displayed as a broken line.

Figure 10:
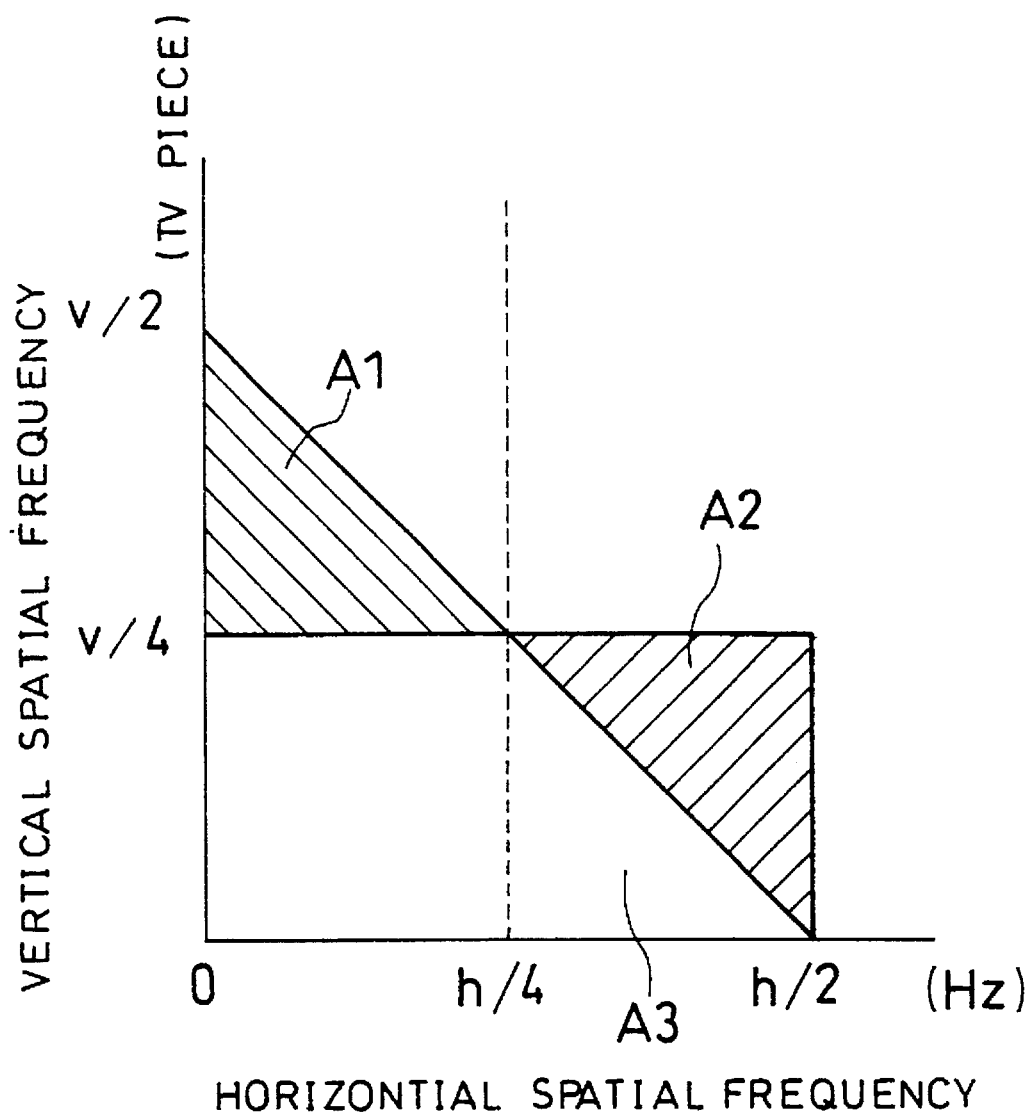
FIG. 10 is a view of the spatial frequency band area of an interference signal.

On the contrary, when a two dimensional low-pass filter is used as the low-pass filter portion 2 in the sub-sampling circuit in FIG. 1, the transmissible band area of an image signal transmitted through the transmission system 4 is a triangular area defined by the maximum vertical spatial frequency v/2 (TV piece) and the maximum horizontal spatial frequency h/2(Hz). However, the transmissible band area of the image signal S1 is a rectangular area defined by the vertical spatial frequency v/4 (TV piece) and the horizontal spatial frequency h/2(Hz) shown in FIG. 8. Accordingly, the spatial frequency band area A1 hatched by oblique lines is folded down to the band area A2, as shown in FIG. 10, such that the image signal S1 becomes a signal which contains interference and of which transmissible band area is a rectangular area. However, this rectangular band area is identical with the transmissible band area of the image signal S2 from the two dimensional low-pass filter 14. Thus, the image signal from the sub-sampling circuit at the image-signal transmitting side is transmitted as the image signal S2 without any loss. Thus, when the image signal S2 is reproduced on the Braun tube, the screen displays a good image in which a horizontal straight line is not displayed as a broken line.

Accordingly, while the operator watches a picture display on the Braun tube, the changeover switch 17 may be switched such that a better screen is selected and fixed. After the screen is fixed, there is selected and supplied the image signal S1 or S2 which has been interpolated using the vertical or two dimensional low-pass filter of which transmissible band area well corresponds to the transmissible band area of the low-pass filter used in the low-pass filter portion 2 of the sub-sampling circuit in FIG. 1. Thus, there is reproduced, on the Braun tube, a good motion picture in which a horizontal straight line is not displayed as a broken line.

As thus discussed, according to the first embodiment, when the sub-sampling circuit and the interpolation processing circuit are different in transmissible band area from each other, the spatial frequency band area which is folded down, can be eliminated by the low-pass filter of the interpolation processing circuit. It is therefore possible to eliminate, for example, interference that a horizontal straight line of a reproduced picture is displayed as a broken line.

(SECOND EMBODIMENT)

Figure 3:
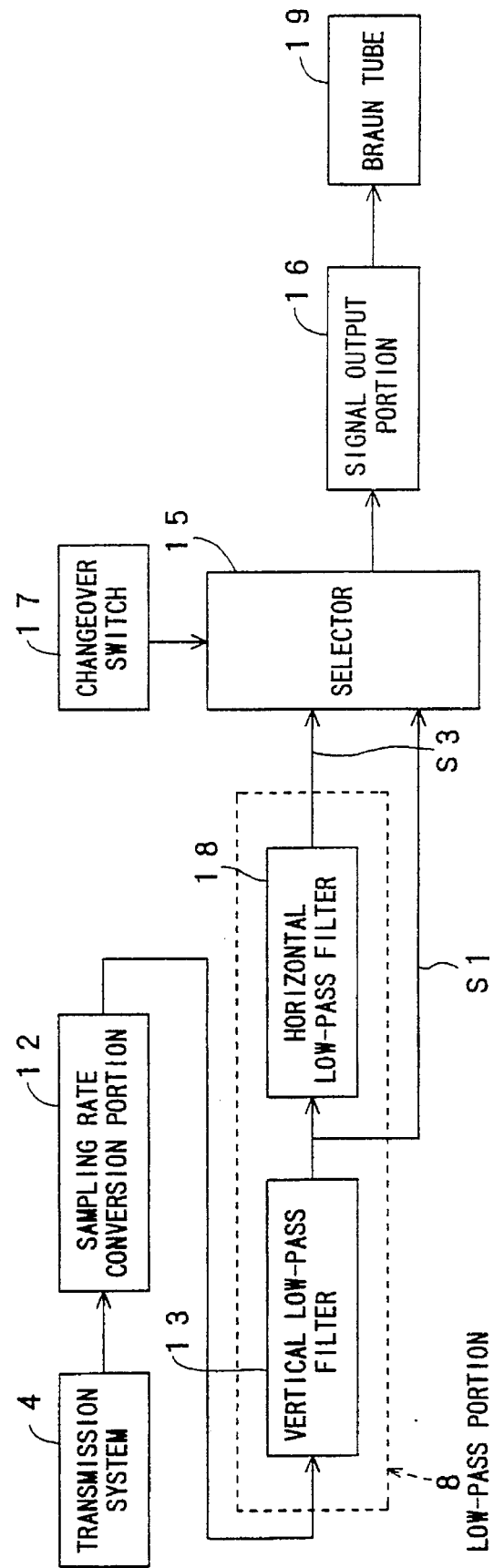
FIG. 3 is a block diagram of an interpolation processing circuit according to a second embodiment of the present invention.

FIG. 3 shows a second embodiment of the present invention, in which a vertical low-pass filter and a horizontal low-pass filter are disposed instead the vertical low-pass filter 13 and the two dimensional low-pass filter 14 disposed at the low-pass portion 8 in the first embodiment.

More specifically, a low-pass portion 8 in FIG. 3 incorporates a vertical low-pass filter (vertical low-pass portion) 13 and a horizontal low-pass filter (horizontal low-pass portion) 18. Likewise in the first embodiment, the vertical low-pass filter 13 has cutoff frequency of v/4 (TV piece). In that transmissible band area of the vertical low-pass filter 13 which previously corresponds to the image-signal transmissible band area provided at the time when the low-pass filter portion 2 in the sub-sampling circuit in FIG. 1 is a vertical low-pass filter, a third image signal from a sampling rate conversion portion 12 is interpolated to generate an image signal S1 serving as a fourth signal.

In the horizontal low-pass filter 18, the cutoff frequency is h/4(Hz) and the image signal S1 from the vertical low-pass filter 13 is interpolated to generate an image signal S3 serving as the fifth image signal.

A selector (signal selector portion) 15 is disposed for selecting the image signal S1 form the vertical low-pass filter 13 or the image signal S3 from the horizontal low-pass filter 18, and the image signal S3 or S4 thus selected is then upplied.

Other components than those above-mentioned are similar to those of the first embodiment. Thus, like parts are designated by like reference numerals and the description thereof is here omitted.

According to the second embodiment, the image signal S1 generated by the vertical low-pass filter 13 passes through the horizontal low-pass filter 18, and its horizontal spatial frequency is limited to h/4(Hz). As a result, there is generated an image signal S3 of which vertical band area is limited to v/4 (TV piece) and of which horizontal band area is limited to h/4(Hz).

After the operator has alternately switched the changeover switch 17, the selector 15 selects a better image signal based on which there is reproduced a picture in which a horizontal straight line is not displayed as a broken line. More specifically, the selector 15 selects the image signal S1 from the vertical low-pass filter 13 when a vertical low-pass filter is used as the low-pass filter portion 2 in the sub-sampling circuit in FIG. 1, and the image signal S3 from the horizontal low-pass filter 18 when a two dimensional low-pass filter is used as the low-pass filter portion 2 in the sub-sampling circuit in FIG. 1.

The transmissible band area of the image signal S3 from the horizontal low-pass filter 18 is a rectangular area defined by a vertical spatial frequency of v/4 (TV piece) and a horizontal spatial frequency of h/4(Hz). Accordingly, the resolution is lowered by the number of scanning lines corresponding to the triangular band areas A1 and A3 in FIG. 10. However, a man's visual sensation is lower to a motion picture than to a static picture. Therefore, a reduction in resolution of a motion picture is hardly sensed and presents no trouble.

As to the circuit size, comparison is made with the low-pass portion 8 of the first embodiment. The first embodiment uses the two dimensional low-pass filter 14 as a portion of the filter required for interpolation processing, while the second embodiment uses the horizontal low-pass filter 18. When forming a two dimensional low-pass filter by a two dimensional filter of 3×3 taps, there are required 8 pieces each of a delay element, an adder and a multiplier. On the other hand, when forming a 3-tap horizontal (one dimensional) filter, there are required only 2 pieces each of a delay element, an adder and a multiplier. Thus, the circuit size can advantageously be reduced as compared with the arrangement using a two dimensional low-pass filter for interpolation processing.

(THIRD EMBODIMENT)

Figure 4:
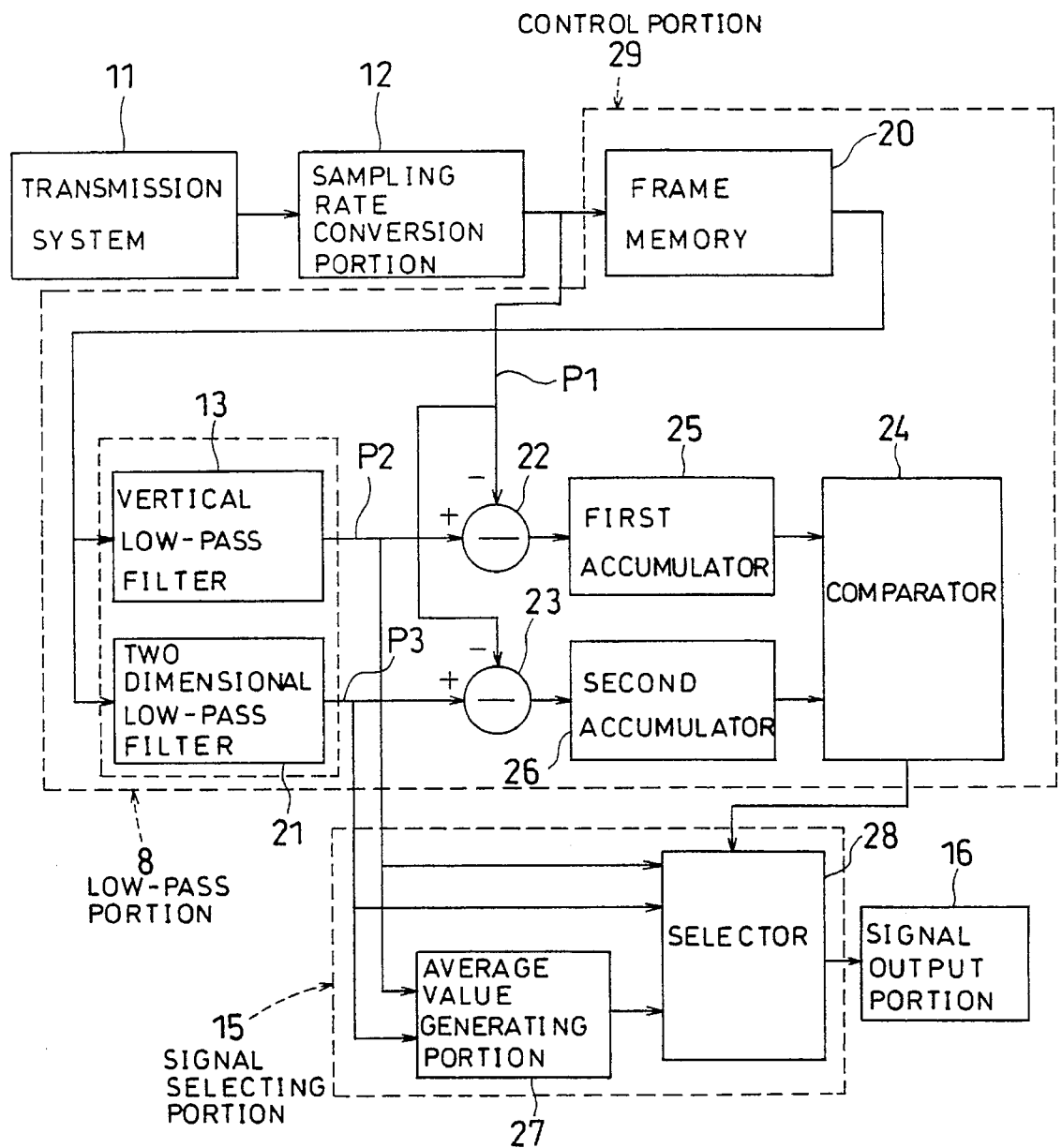
FIG. 4 is a block diagram of an interpolation processing circuit according to a third embodiment of the present invention.

FIG. 4 is a block diagram of an interpolation processing circuit according to a third embodiment of the present invention. In each of the first and second embodiments, an image signal is selectively switched by the manual operation of the changeover switch 17 by the operator. The third embodiment is arranged such that an image signal is automatically switched.

Shown in FIG. 4 are a transmission system 4 and a sampling rate conversion portion 12 for inserting zero into each of interpolation points.

A low-pass portion 8 incorporates a vertical low-pass filter 13 of which cutoff frequency is v/4 (TV piece), and a two dimensional low-pass filter 21 of which transmissible band area is a triangular band area defined by the maximum vertical spatial frequency of v/2 (TV piece) and the maximum horizontal spatial frequency of h/2(Hz). A signal selecting portion 15 incorporates a selector 28 serving as a signal selecting portion for switching an image signal P2 from the vertical low-pass filter 13 and an image signal P3 from the two dimensional low-pass filter 21. A signal output portion 16 is also disposed.

A control portion (selection control means) 29 incorporates a frame memory 20 for accumulating a portion of an image signal P1 for a predetermined one frame (the Nth frame) from the sampling rate conversion portion 12, a first difference operating portion 22, a second difference operating portion 23, a first accumulator 25 for accumulating outputs from the first difference operating portion 22, a second accumulator 26 for accumulating outputs from the second difference operating portion 23, and a comparator 24. The vertical low-pass filter 13 also serves as a vertical interpolation portion, and the two dimensional low-pass filter 21 also serves as a two dimensional interpolation portion. An image signal from the frame memory 20 is supplied to the vertical low-pass filter 13 and the two dimensional low-pass filter 21.

The first difference operating portion 22 of the control portion 29 is arranged to calculate differences between an image signal from the sampling rate conversion portion 12 and an image signal from the vertical low-pass filter 13, i.e., differences between the sampling points of an arbitrary one frame (the Nth frame) and the interpolation points of the next frame (the (N+1)th frame) at the positions corresponding to the sampling points above-mentioned. The differences thus calculated are supplied from the first difference operating portion 22. Likewise, the second difference operating portion 23 is arranged to calculate differences between an image signal from the sampling rate conversion portion 12 and an image signal from the two dimensional low-pass filter 21. The differences thus calculated are supplied from the second difference operating portion 23.

The comparator 24 is disposed for comparing in size (i) an output of the first accumulator 25, i.e., an accumulated value of difference results for a plurality of frames from the first difference operating portion 22, with a predetermined value, and (ii) an output of the second accumulator 26, i.e., an accumulated value of difference results for a plurality of frames from the second difference operating portion 23, with a predetermined value. Further, when both the output of the first accumulator 25 and the output of the second accumulator 26 are smaller than the respective predetermined values, the comparator 24 compares the accumulated values with each other and supplies, to the selector 28, a signal representing that the image signal of which difference accumulated value is smaller, is an image signal P2 or P3. When both the difference accumulated values are not less than the respective predetermined values, the comparator 24 supplies, to the selector 28, a signal representing that neither image signal P2 nor image signal P3 can be selected.

The signal selecting portion 15 has, in addition to the selector 28, an average value generating portion 27. The average value generating portion 27 has the function of generating the average value of the image signal P2 from the vertical low-pass filter 13 of the low-pass portion 8 and the image signal P3 from the two dimensional low-pass filter 21 of the low-pass portion 8.

The following description will discuss the operation of the interpolation processing circuit according to the third embodiment of the present invention having the arrangement above-mentioned.

In the interpolation processing circuit, after an image signal compressed in band area by the sub-sampling circuit has been received, the sampling rate conversion portion 12 is operated to put, (i) in the even-numbered frames of the image signal, zero into each of other sampling points than the sampling points 52 in the even-numbered Frames in the form of a quincunx shown in FIG. 7(a), and (ii) in the odd-numbered frames of the image signal, zero into each of other sampling points than the sampling points 53 in the odd-numbered frames in the form of a quincunx shown in FIG. 7(b). Thus, the sampling frequency of the image signal is returned to the original one. Then, the interpolation processing circuit supplies an image signal P1 having the original sampling frequency.

In the control portion 29, the frame memory 20 sends, with one-frame delay, the image signal P1 to the vertical low-pass filter 13 and the two dimensional low-pass filter 21. In the low-pass portion 8, the vertical low-pass filter 13 generates an image signal P2 interpolated in a vertical direction, and the two dimensional low-pass filter 21 generates an image signal P3 interpolated in two dimensional directions.

The first difference operating portion 22 and the second difference operating portion 23 supply differences between the image signals P1 and P2 and differences between the image signals P1 and P3, respectively, and such differences for a plurality of frames are accumulated by the first accumulator 25 and the second accumulator 26, respectively.

Thereafter, the comparator 24 compares, with each other, the accumulated values of differences which correspond to the sampling points of the image signal P1 and which are supplied from the first accumulator 25 and the second accumulator 26. Then, the comparator 24 supplies, to the selector 28, a signal representing the image signal for which accumulated value of differences is smaller. Upon reception of an output from the comparator 24, the selector 28 selects the image signal P2 or P3 for which the accumulated value of differences is smaller, and the image signal P2 or P3 thus selected is supplied from the signal output portion 16 and reproduced on an Braun tube 19.

In operation of differences at the first and second difference operating portions 22, 23, the image signal P1 and the image signal P2 are positionally shifted by one frame and the image signal P1 and the image signal P3 are positionally shifted by one frame, such that the positional relationship between the sampling points and the interpolation points in the image signal P1 is reverse to that in each of the image signals P2, P3. For example, the sampling points of the image signal P1 correspond to the interpolation points of each of the image signals P2, P3. Accordingly, a signal which is supplied from the comparator 24 and which represents the image signal having a smaller accumulated value of differences, is a signal representing the image signal having no aliasing interference.

More specifically, when the band area is limited using a vertical low-pass filter as the low-pass filter portion 2 in the sub-sampling circuit at the image-signal transmitting side in FIG. 1, the selector 28 selects the image signal P2 supplied from the vertical low-pass filter 13. Here, the transmissible band area of an image signal transmitted through the transmission system 4, is a rectangular area defined by a vertical spatial frequency of v/4 (TV piece) and a horizontal spatial frequency of h/2(Hz) shown in FIG. 8, and is identical with the transmissible band area of the image signal P2.

When the band area is limited using a two dimensional low-pass filter as the low-pass filter portion 2 in the subsampling circuit in FIG. 1, the selector 28 selects the image signal P3 supplied from the two dimensional low-pass filter 21. Here, the transmissible band area of an image signal transmitted through the transmission system 4 is a triangular area defined by the maximum vertical spatial frequency of v/2 (TV piece) and the maximum horizontal spatial frequency of h/2(Hz) as shown in FIG. 9. This triangular band area is identical with the transmissible band area of the image signal P3. This prevents the spatial frequency band area from being folded down. Accordingly, an image signal from the sub-sampling circuit at the image-signal transmitting side can be transmitted without any loss and successfully reproduced at a receiving side.

Further, the differences for a plurality of frames are accumulated by the first accumulator 25 and the second accumulator 26, and the comparator 24 compares the respective accumulated values with each other. Accordingly, there can accurately be selected the image signal interpolated by the low-pass filter of which transmissible band area properly corresponds to the signal transmissible band area of the low-pass filter employed at the low-pass filter portion 2 of the sub-sampling circuit in FIG. 1.

Further, when both the accumulated values of differences of the first accumulator 25 and the second accumulator 26 are not less than the respective predetermined values, i.e., when the motion of a picture image between adjacent frames is great, the selector 28 selects the image signal which contains less aliasing interference and which is supplied from the average value generating portion 27 (an image signal obtained by averaging the image signal P2 and the image signal P3). This lowers an interference signal in signal intensity, thus reproducing a good picture in which a horizontal straight line is not displayed as a broken line.

As thus discussed, the third embodiment is arranged such that there is suitably selected and supplied the image signal interpolated with the low-pass filter of which transmissible band area properly corresponds to the signal transmissible band area of the vertical low-pass filter or two dimensional low-pass filter used at the low-pass filter portion 2 of the sub-sampling circuit in FIG. 1. Accordingly, the transmissible band areas of the sub-sampling circuit and the interpolation processing circuit are identical with each other or approximate to each other. This prevents the spatial frequency band area from being folded down due to a difference in transmissible band areas area. This advantageously effectively restrains the occurrence of interference which causes a horizontal straight line in a reproduced image to be displayed as a broken line.

(FOURTH EMBODIMENT)

Figure 11:
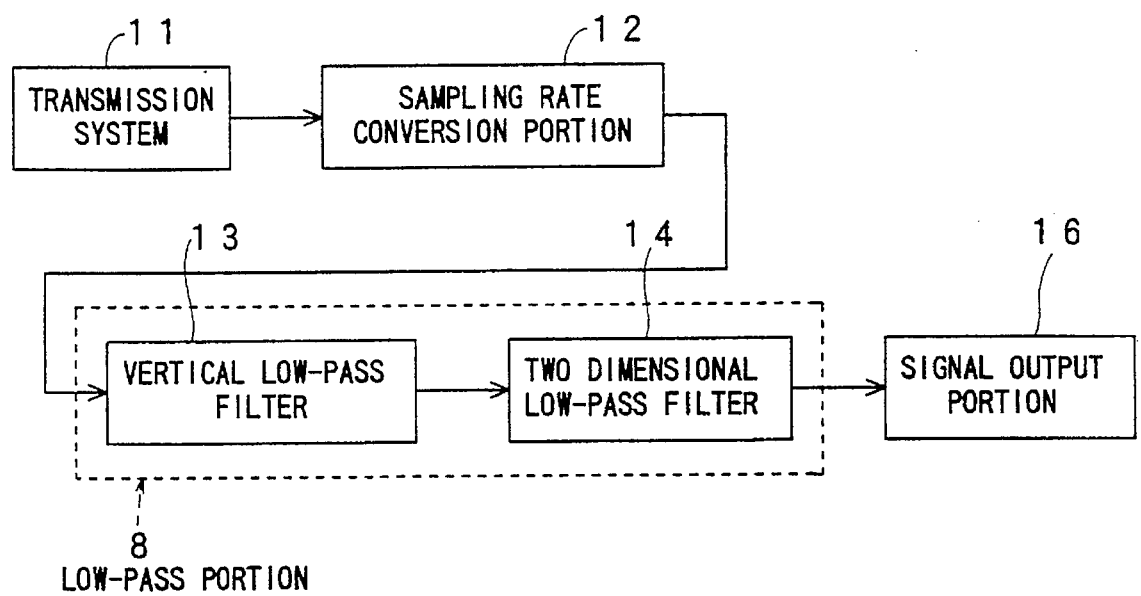
FIG. 11 is a block diagram of an interpolation processing circuit according to a fourth embodiment of the present invention.

FIG. 11 shows a fourth embodiment of the present invention. Each of the first to third embodiments is arranged such that either one of two-type low-pass filters disposed at the low-pass portion 8 is selected. However, the fourth embodiment employs an arrangement having a low-pass filter of which transmissible band area corresponds to the overlapping portion of the transmission band areas of the vertical low-pass filter and the two dimensional low-pass filter used at the low-pass filter portion 2 of the sub-sampling circuit in FIG. 1.

More specifically, an interpolation processing circuit in FIG. 11 has a low-pass portion 8 in which a vertical low-pass filter (first low-pass filter portion) 13 is connected in series to a two dimensional low-pass filter (second low-pass filter portion) 14. The selector 15 in the first embodiment is neither required nor disposed in the fourth embodiment.

Accordingly, the signal transmissible band area of the low-pass portion 8 includes (i) a rectangular area defined by a vertical spatial frequency of v/4 (TV piece) and a horizontal spatial frequency of h/4(Hz) shown in FIG. 10 and (ii) a triangular area A3 in FIG. 10.

Therefore, no matter which filter, the vertical low-pass filter or the two dimensional low-pass filter, may be used at the low-pass filter portion 2 of the sub-sampling portion in FIG. 1, an image signal interpolated by the vertical low-pass filter 13 and the two dimensional low-pass filter 14 in the low-pass portion 8 contains no aliasing interference component. Thus, there can be obtained, on the Braun tube or the like, a good motion picture in which a horizontal straight line is not displayed as a broken line.

In the transmissible band area of an image signal from the low-pass portion 8, the resolution is lowered by the number of scanning lines corresponding to the triangular band areas A1 and A2 in FIG. 10. However, a man's visual sensation is lower to a motion picture than to a static picture. Therefore, a reduction in resolution of a motion picture is hardly sensed and presents no trouble.

In the fourth embodiment, the two dimensional low-pass filter 14 is disposed downstream of the vertical low-pass filter 13. However, it is a matter of course that the two dimensional low-pass filter 14 can be disposed upstream of the vertical low-pass filter 13.

(FIFTH EMBODIMENT)

Figure 12:
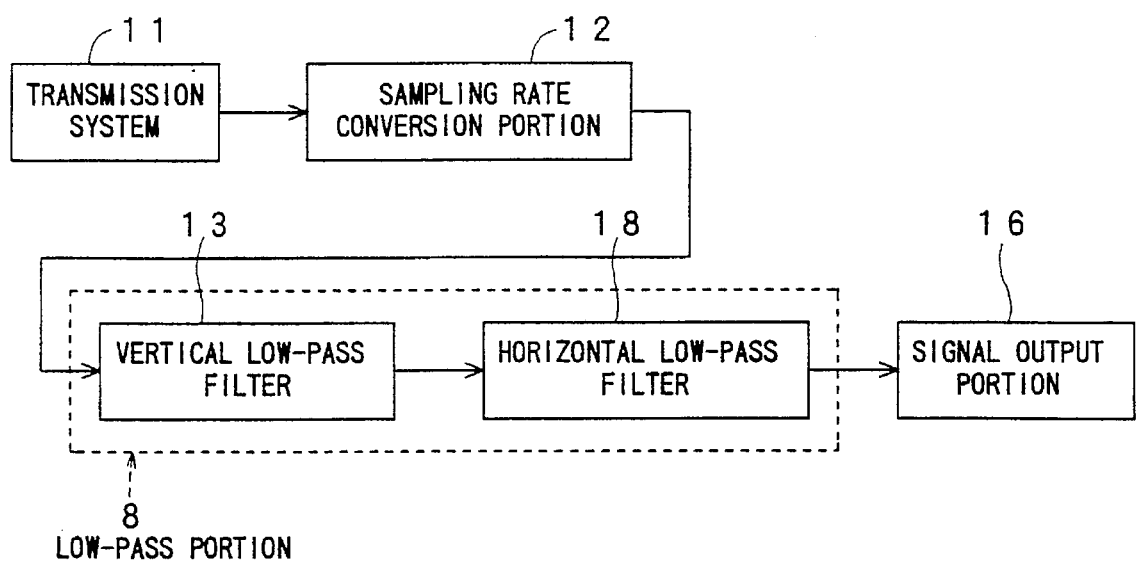
FIG. 12 is a block diagram of an interpolation processing circuit according to a fifth embodiment of the present invention.
Figure 13:
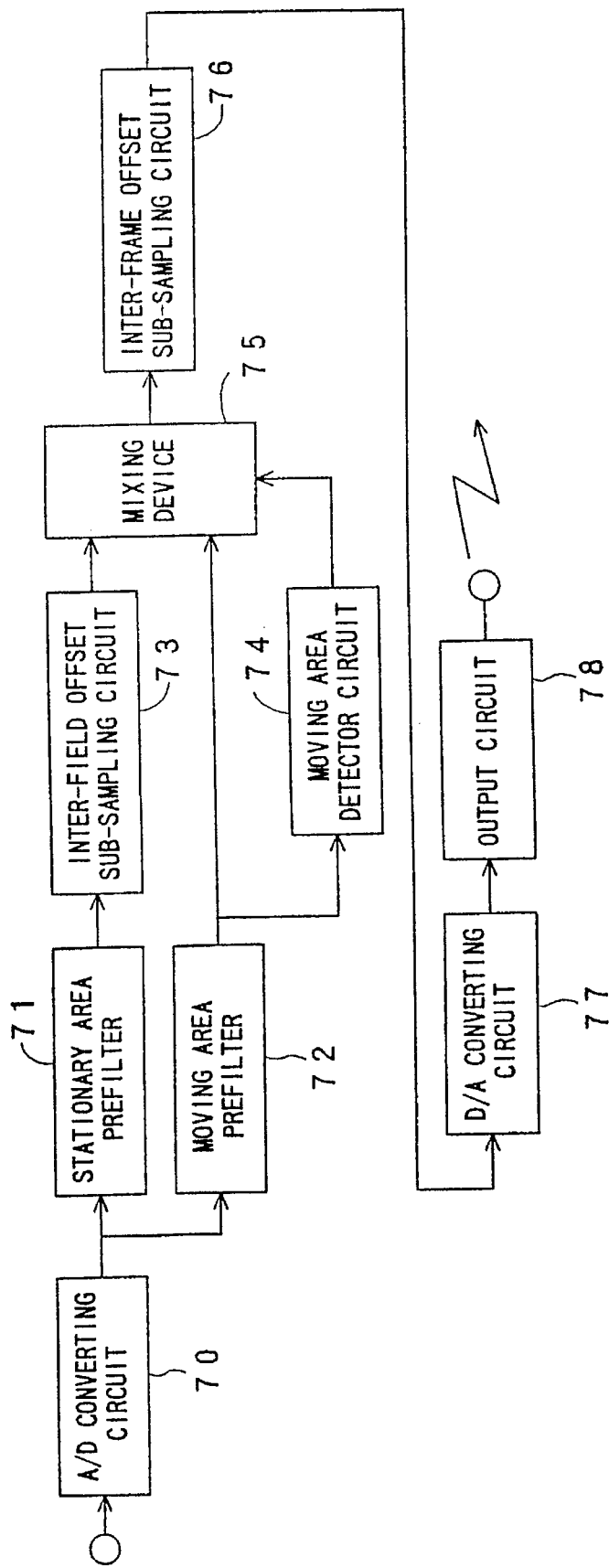
FIG. 13 is a schematic block diagram of the arrangement of an image-signal transmitting side in its entirety.
Figure 14:
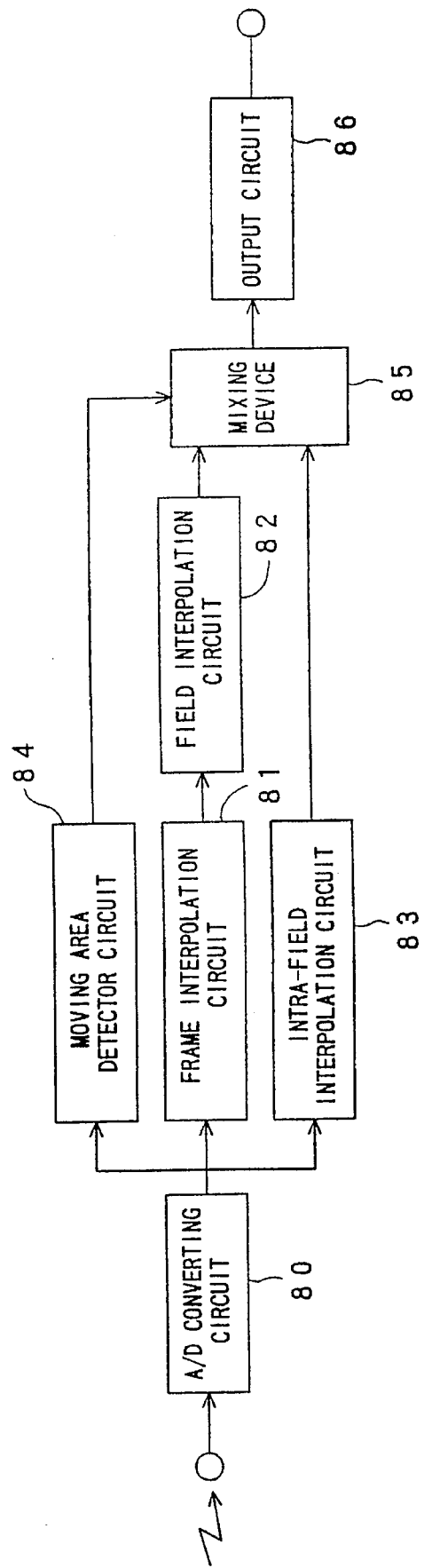
FIG. 14 is a schematic block diagram of the arrangement of a TV receiver side in its entirety.
Figure 15:
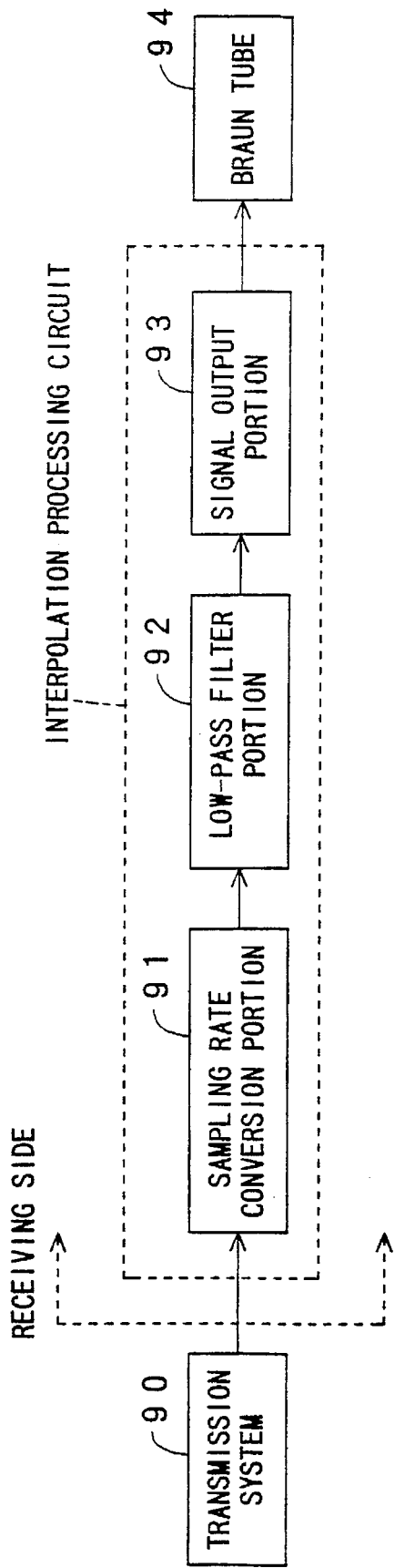
FIG. 15 is a block diagram of an interpolation processing circuit of prior art.

FIG. 12 shows a fifth embodiment of the present invention, in which a horizontal low-pass filter (second low-pass filter portion) 18 is disposed instead of the two dimensional low-pass filter 14 at the low-pass portion in the fourth embodiment. Other components in the fifth embodiment are similar to those used in the fourth embodiment in FIG. 11, and the description thereof is therefore omitted here.

According to the fifth embodiment, the signal transmissible band area of the low-pass portion 8 is a rectangular area defined by a vertical spatial frequency of v/4 (TV piece) and a horizontal spatial frequency of h/4(Hz) shown in FIG. 10. Therefore, no matter which filter, the vertical low-pass filter or the two dimensional low-pass filter, may be used at the low-pass filter portion 2 of the sub-sampling portion in FIG. 1, an image signal interpolated by the vertical low-pass filter 13 and the horizontal low-pass filter 18 in the low-pass portion 8, contains no aliasing interference component likewise in the fourth embodiment. Thus, there can be obtained, on the Braun tube or the like, a good motion picture in which a horizontal straight line is not displayed as a broken line.

In the transmissible band area of an image signal from the low-pass portion 8, the resolution is lowered by the number of scanning lines corresponding to the triangular band areas A1, A2 and A3 in FIG. 10. However, a man's visual sensation is lower to a motion picture than to a static picture. Therefore, a reduction in resolution of a motion picture is hardly sensed and presents no trouble.

As to the circuit size of the horizontal low-pass filter 18, comparison is made with the two dimensional low-pass filter 14 of the low-pass portion 8 of the fourth embodiment. The fifth embodiment can be arranged in a simple structure in which the number of each of delay elements, adders and multipliers is reduced to two from eight. Thus, the circuit size can advantageously be reduced as compared with the arrangement using a two dimensional low-pass filter for interpolation processing.

I claim:

1. A circuit for executing an interpolation processing on a sub-sampled image signal, so arranged as to receive, from a transmitting side comprising:

(i) a transmitting-side low-pass filter portion which uses, as a prefilter for eliminating the high frequency component of a first image signal primitively sampled in the form of a square lattice, one of a first low-pass filter and a second low-pass filter of which transmissible band area is different from that of said first low-pass filter, said first low-pass filter including a vertical low-pass filter, and said second low-pass filter including a two dimensional low-pass filter, and (ii) a sub-sampling portion for subsampling said first image signal after limited in band area by said transmitting-side low-pass filter portion, said first image signal being sub-sampled as inter-frame offset in the form of a quincunx a second image signal obtained by sub-sampling said first image signal by said sub-sampling portion, said second image signal being subjected to interpolation processing;

said circuit for executing an interpolation processing on a sub-sampled image signal comprising:

a sampling rate conversion portion for generating a third image signal by interpolating zero into said second image signal;

a low-pass portion for generating (i) a fourth image signal by interpolating said third image signal generated by said sampling rate conversion portion, with a low-pass filter of which transmissible band area previously corresponds to the transmissible band area of said first low-pass filter, and (ii) a fifth image signal by interpolating said third image signal generated by said sampling rate conversion portion, with a low-pass filter of which transmissible band area previously corresponds to the transmissible band area of said second low-pass filter, said low-pass portion comprising: a vertical low-pass portion for generating said fourth image signal by interpolating, with a vertical low-pass filter, said third image signal from said sampling rate conversion portion; and a two dimensional low-pass portion for generating said fifth image signal by interpolating, with a two dimensional low-pass filter, said third image signal from said sampling rate conversion portion;

selection control means for supplying an instruction signal which instructs to select said fourth or fifth image signal generated by said low-pass portion; and a signal selecting portion for selecting, based on the contents of said instruction signal from said selection control means, said fourth or fifth image signal generated by said lowpass portion, said fourth or fifth image signal thus selected being then supplied.

2. A circuit for executing an interpolation processing on a sub-sampled image signal according to claim 1, wherein said low-pass portion comprises: a vertical low-pass portion for generating said fourth image signal by interpolating, with a vertical low-pass filter, said third image signal from said sampling rate conversion portion; and a two dimensional low-pass portion for generating said fifth image signal by interpolating, with a two dimensional low-pass filter, said fourth image signal from said vertical low-pass portion, and said vertical low-pass portion and said two dimensional low-pass portion of said low-pass portion respectively serve as said vertical interpolating portion and said two dimensional interpolating portion of said selection control means.

3. A circuit for executing an interpolation processing on a sub-sampled image signal, so arranged as to receive, from a transmitting side comprising:

(i) a transmitting-side low-pass filter portion which uses, as a prefilter for eliminating the high frequency component of a first image signal primitively sampled in the form of a square lattice, one of a first low-pass filter and a second low-pass filter of which transmissible band area is different from that of said first low-pass filter, said first low-pass filter including a vertical low-pass filter, and said second low-pass filter including a two dimensional low-pass filter, and (ii) a sub-sampling portion for subsampling said first image signal after limited in band area by said transmitting-side low-pass filter portion, said first image signal being sub-sampled as inter-frame offset in the form of a quincunx;

a second image signal obtained by sub-sampling said first image signal by said sub-sampling portion, said second image signal being subjected to interpolation processing;

said circuit for executing an interpolation processing on a sub-sampled image signal comprising:

a sampling rate conversion portion for generating a third image signal by interpolating zero into said second image signal;

a low-pass portion for generating (i) a fourth image signal by interpolating said third image signal generated by said sampling rate conversion portion, with a low-pass filter of which transmissible band area previously corresponds to the transmissible band area of said first low-pass filter, and (ii) a fifth image signal by interpolating said third image signal generated by said sampling rate conversion portion, with a low-pass filter of which transmissible band area previously corresponds to the transmissible band area of said second low-pass filter, said low-pass portion comprising:

a vertical low-pass portion for generating said fourth image signal by interpolating, with a vertical low-pass filter, said third image signal from said sampling rate conversion portion; and a horizontal low-pass portion for generating said fifth image signal by interpolating, with a horizontal low-pass filter, said fourth image signal from said vertical low-pass portion;

selection control means for supplying an instruction signal which instructs to select said fourth or fifth image signal generated by said low-pass portion; and a signal selecting portion for selecting, based on the contents of said instruction signal from said selection control means, said fourth or fifth image signal generated by said lowpass portion, said fourth or fifth image signal thus selected being then supplied.

4. A circuit for executing an interpolation processing on a sub-sampled image signal according to any one of claims 1 and 3, wherein there is disposed a Braun tube for displaying, on the screen thereof, said fourth or fifth image signal supplied from said signal selecting portion, and said selection control means is a changeover switch to be manually operated by the operator who watches said screen of said Braun tube, the manual operation being made based on the quality of a picture on said screen.

5. A circuit for executing an interpolation processing on a sub-sampled image signal according to any one of claims 1 and 3, wherein said selection control means is arranged to generate an instruction signal based on said second image signal obtained by sub-sampling said first image signal by said sub-sampling portion, and said fourth and fifth image signals generated by said low-pass portion.

6. A circuit for executing an interpolation processing on a sub-sampled image signal according to any one of claims 1 and 3, wherein said first low-pass filter is a vertical low-pass filter and said second low-pass filter is a two dimensional low-pass filter, and said selection control means comprises: a vertical interpolating portion for interpolating, with a vertical low-pass filter, an Nth frame of said third image signal at said sampling rate conversion portion, where N is an arbitrary positive integer, thereby to generate first interpolation points;

a two dimensional interpolating portion for interpolating, with a two dimensional low-pass filter, the Nth frame of said third image signal at said sampling rate conversion portion, thereby to generate second interpolation points; a first difference operating portion for generating differences between the sampling points in the (N+1)th frame of said third image signal and said first interpolation points; a second difference operating portion for generating differences between the sampling points in the (N+1)th frame of said third image signal and said second interpolation points; and a comparator for comparing said differences generated by said first difference operation portion with said differences generated by said second difference operating portion and for supplying an instruction signal such that said fourth image signal is selected when said differences generated by said first difference operating portion are smaller than said differences generated by said second difference operating portion, or that said fifth image signal is selected when said differences generated by said first difference operating portion are not less than said differences generated by said second difference operating portion.

7. A circuit for executing an interpolation processing on a sub-sampled image signal according to any one of claims 1 and 3 wherein said selection control means comprises:

a first accumulator for accumulating outputs of said first difference operating portion for a plurality of frames to generate a first accumulated value; and a second accumulator for accumulating outputs of said second difference operating portion for a plurality of frames to generate a second accumulated value, and said comparator compares said accumulated values of said first and second accumulators with each other.

8. A circuit for executing an interpolation processing on a sub-sampled image signal according to any one of claims 1 and 3 wherein said signal selecting portion has an average value generating portion for generating the average of said fourth and fifth image signals, and said selection control means is arranged to supply an instruction signal such that the average value generated by said average value generating portion is supplied when both said differences at said first difference operating portion and said differences at said second difference operating portion are greater than the respective predetermined values.

9. A circuit for executing an interpolation processing on a sub-sampled image signal, so arranged as to receive, from a transmitting side comprising:

(i) a transmitting-side low-pass filter portion which uses, as a prefilter for eliminating the high frequency component of a first image signal primitively sampled in the form of a square lattice, one of a first low-pass filter and a second low-pass filter of which transmissible band area is different from that of said first low-pass filter, said first low-pass filter including a vertical low-pass filter, and said second low-pass filter including a two dimensional low-pass filter, and (ii) a sub-sampling portion for subsampling said first image signal after limited in band area by said transmitting-side low-pass filter portion, said first image signal being sub-sampled as inter-frame offset in the form of a quincunx, a second image signal obtained by sub-sampling said first image signal by said sub-sampling portion, said second image signal being subjected to interpolation processing, said circuit for executing an interpolation processing on a sub-sampled image signal comprising: a sampling rate conversion portion for generating a third image signal by interpolating zero into said second image signal; and a low-pass portion for generating a fourth image signal by interpolating said third image signal generated by said sampling rate conversion portion, which a low-pass filter of which transmissible band area previously corresponds to an overlapping portion for the respective transmissible band areas of said first low-pass filter and said second low-pass filter, wherein said low-pass portion comprises:

a first low-pass filter portion for interpolating said third image signal from said sampling rate conversion portion, with a low-pass filter of which transmissible band area previously corresponds to the transmissible band area of said first low-pass filter, said first low-pass filter portion of said low-pass portion arranged to interpolate said third image signal from said sampling rate conversion portion, with a vertical low-pass filter; and a second low-pass filter portion for further interpolating the signal thus interpolated by said first low-pass filter portion, with a low-pass filter of which transmissible band area previously corresponds to the transmissible band area of said second low-pass filter, said second low-pass filter portion for further interpolating the signal thus interpolated by said first low-pass filter portion, with a two dimensional low-pass filter of which transmissible band area previously corresponds to the transmissible band area of said second low-pass filter.

10. A circuit for executing an interpolation processing on a sub-sampled image signal, so arranged as to receive, from a transmitting side comprising:

(i) a transmitting-side low-pass filter portion which uses, as a prefilter for eliminating the high frequency component of a first image signal primitively sampled in the form of a square lattice, one of a first low-pass filter and a second low-pass filter of which transmissible band area is different from that of said first low-pass filter, and (ii) a sub-sampling portion for subsampling said first image signal after limited in band area by said transmitting-side low-pass filter portion, said first image signal being sub-sampled as inter-frame offset in the form of a quincunx, a second image signal obtained by sub-sampling said first image signal by said sub-sampling portion, said second image signal being subjected to interpolation processing, said circuit for executing an interpolation processing on a sub-sampled image signal comprising: a sampling rate conversion portion for generating a third image signal by interpolating zero into said second image signal; and a low-pass portion for generating a fourth image signal by interpolating said third image signal generated by said sampling rate conversion portion, with a low-pass filter of which transmissible band area previously corresponds to an overlapping portion of the respective transmissible band areas of said first low-pass filter and said second low-pass filter, wherein said first low-pass filter of said transmitting-side low-pass filter portion is a vertical low-pass filter and said second low-pass filter of said transmitting-side low-pass filter portion is a two dimensional low-pass filter, a first low-pass filter portion of said low-pass portion is arranged to interpolate said third image signal from said sampling rate conversion portion, with a vertical low-pass filter, and a second low-pass filter portion of said low-pass portion is arranged to further interpolate, with a horizontal low-pass filter, the signal thus interpolated with said first low-pass filter portion.

* * * * *